UNITED STATES PATENT OFFICE 2,628,254

PROCESS OF PRODUCING AMINO ACETALS

John W. Copenhaver, Easton, Pa., assignor to General Aniline & Film Corporation, New York, N. Y., a corporation of Delaware No Drawing. Application November 13, 1948, Serial No. 59,974

5 Claims. (Cl. 260—584)

This invention relates to an improvement in the production of amino acetals by reacting ammonia or an aromatic primary amine with a haloacetal.

The reaction of ammonia and aromatic primary amines with haloacetals to produce amino acetals is known in the art, but the preparation of the amino acetals by this process in good yield, and in good purity, has not been achieved.

I have now found that the ammonium halides or amine hydrohalides which are formed during the course of the reaction causes hydrolysis and resinification of the amino acetal, thus decreasing the yield and also complicating the isolation of the reaction product. I have discovered that by carrying out the reaction in the presence of an inert solvent for the reactants which is a non-solvent for the ammonium halides or amine hydrohalides which are formed during the course of the reaction, these products (ammonium or amine hydrohalides) are precipitated and thus removed from the reaction zone, so that their deleterious action is avoided. Consequently, by carrying out the reaction in this manner, a higher yield of a more easily isolated product is obtained.

The reaction involved in the present invention may be formulated as follows:

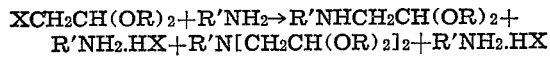

wherein X is halogen (e. g. chlorine, bromine or iodine, but generally chlorine), R is alkyl, aryl or aralkyl, and R' is hydrogen or aryl.

The process of the present invention, while generally operable with both alkyl and aryl primary amines in addition to ammonia, does not possess any great advantage with alkyl amines which have a fairly high dissociation constant (i. e. higher than ammonia itself), since it is only where an amine hydrohalide is formed that dissociates itself that the process of the present invention gives a substantial improvement. Accordingly, the description of the present process will be limited to ammonia and aryl primary amines which do not have a larger dissociation constant than ammonia itself. As examples of such amines may be mentioned aniline, toluidine, naphthylamine, and the like.

The process has been found to be generally applicable to the reaction of haloacetals and as a general rule, the lower dialkyl haloacetals are employed, such as diethyl-β-chloroacetal, dimethyl-β-chloroacetal, methylethyl-β-chloroacetal, dibutyl-β-chloroacetal, diamyl-β-chloroacetal, and the corresponding bromo- or iodo-compounds, and the like. However, the process is also applicable with such acetals as diphenyl-β-chloroacetal, dibenzyl-β-chloroacetal, methylphenyl-β-chloroacetal and similar compounds.

The solvent employed for the reaction is, as stated, an inert (i. e. non-reactive) solvent which while a good solvent for the reactants, is a non-solvent for any ammonium halide or amine hydrohalide which is formed. Suitable solvents are hydrocarbons; alcohols containing at least 3 and preferably 4 or more carbon atoms, such as butanol, amyl alcohol, cyclohexanol, and the like; ethers such as diethyl ether, methlethyl ether, and the like. The amount of solvent which should be employed should be sufficient so that the reaction mixture is readily fluid, in order that any salts formed may be precipitated readily.

The other conditions of reaction, aside from the solvent employed, may advantageously be those commonly employed in the art for this type of reactions (i. e. in general, a substantial excess of ammonia or amine is employed and a temperature of from 100–150° C. (and usually within the range of 120–130° C.). When the acetal, the solvent and the amine boil at or above the reaction temperature, atmospheric pressure may be employed. However, where necessary, superatmospheric pressure will, of course, be employed to keep the reactants in liquid phase.

The details of the present invention will be apparent to those skilled in the art from a consideration of the following specific examples, in which the parts are by weight:

Example I

The procedure described in Organic Synthesis, volume 24, page 3, was duplicated, except that ethanol, there specified as a solvent, was replaced by benzene. In carrying out the process, 1068 parts (7 mols) of diethyl chloroacetal, 1750 parts of benzene and 2548 parts (149 mols) of liquid ammonia were heated at 121–128° C. in a closed autoclave for 12 hours at a maximum pressure of 1070 pounds. The reaction mixture was then cooled and vented and the autoclave washed with benzene and filtered to remove ammonium chloride. The filtrate was distilled over sodium hydroxide pellets to yield:

1. 540 grams (58%) aminodiethylacetal, (boiling point 91° C./71 mm.), $n_D^{25}$ 1.4150, $d_4^{25}$ 0.9152
2. 192 grams (22%) 2,2,2',2'-tetraethoxy diethylamine, (boiling point 107° C./2 mm.), $n_D^{25}$ 1.4230, $d_4^{25}$ 0.9417

This yield compares with the yield of 32-39 per cent of amino diethylacetal and 11-14% of 2,2,2',2' - tetraethoxy diethylamine (diacetalylamine) when employing ethanol as the solvent for the reaction.

*Example II*

1460 parts (7 mols) of di-n-butyl chloroacetal, 1480 parts (20 mols) of n-butanol and 2445 parts (143.8 mols) of liquid ammonia were heated for 12 hours at 120-130° C. and a maximum pressure of 925 pounds in a closed autoclave. The reaction mixture was then cooled to 60° C. and excess ammonia vented off. The contents of the autoclave were discharged and the autoclave washed with butanol and the reaction products then filtered to remove the gray-brown sludge of ammonium chloride. The filtrate was then distilled over sodium hydroxide pellets to give, after removing the n-butanol:

1. 866 grams (65.3% on chloroacetal) amino-di-n-butyl acetal (boiling point 86° C./3 mm.), $n_D^{25}$ 1.4280, $d_4^{25}$ 0.8846 and
2. 360 grams (28.6% on chloroacetal) 2,2'-tetra-n-butoxy diethylamine (boiling point 159° C/0.7 mm.) $n_D^{25}$ 1.4352, $d_4^{25}$ 0.9021.

I claim:

1. A process for the production of amino acetals from chloro acetals which comprises heating to a temperature of from 120-130° C. and at superatmospheric pressure; β-chloro di-lower alkyl acetal of acetaldehyde and a substantial excess of anhydrous ammonia in a non-solvent for ammonium chloride selected from the group consisting of benzene, saturated aliphatic and cyclo aliphatic alcohols of from 4 to 6 carbon atoms and lower di-alkyl ethers.
2. The process as defined in claim 1 wherein the inert solvent employed is butanol.
3. The process as defined in claim 1 wherein the chloro acetal specified is β-chloro di-ethyl acetaldehyde.
4. The process as defined in claim 3 wherein the inert solvent employed is butanol.
5. The process as defined in claim 3 wherein the inert solvent employed is benzene.

JOHN W. COPENHAVER.

REFERENCES CITED

The following references are of record in the file of this patent:

UNITED STATES PATENTS

| Number | Name | Date |
|---|---|---|
| 2,034,427 | Campbell | Mar. 17, 1936 |
| 2,490,385 | Sweet | Dec. 6, 1949 |

OTHER REFERENCES

Wohl, "Ber. deut. Chem.," vol. 21, p. 616 (1888).

Rath, "Ber. deut. Chem.," vol. 57, pp. 550-555 (1924).

Buck et al., "J. Am. Chem. Soc.," vol. 51, pp. 3612-3613 (1929).

Allen et al., "Organic Synthesis" (J. Wiley, Inc., N. Y., 1944), vol. 24, pp. 3 to 6 (1944).